Dec. 16, 1930. J. BROGDEN Re. 17,901
WORKTABLE
Original Filed Dec. 28, 1926
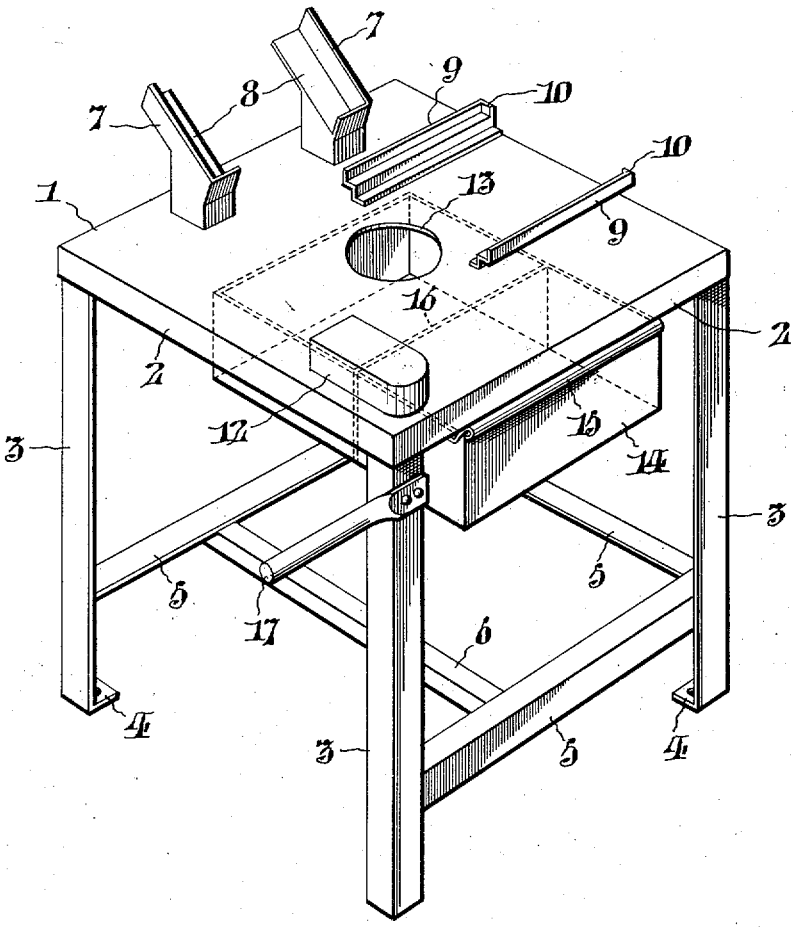
WITNESSES
Thomas W. Kerr Jr.
William Dell, Jr.
INVENTOR:
Joah Brogden,
BY Fraley & Paul
ATTORNEYS.

Reissued Dec. 16, 1930 Re. 17,901

UNITED STATES PATENT OFFICE

JOAH BROGDEN, OF MELROSE PARK, PENNSYLVANIA, ASSIGNOR TO DAVID LUPTON'S SONS COMPANY, OF PHILADELPHIA, PENNSYLVANIA, A CORPORATION OF PENNSYLVANIA

WORKTABLE

Original No. 1,703,074, dated February 19, 1929, Serial No. 157,443, filed December 28, 1926. Application for reissue filed October 10, 1930. Serial No. 487,882.

This invention relates to work tables of a type more particularly useful to workers customarily known in the knitting industry as "toppers", skilled in transferring knitted fabrics, for example, stocking legs produced on one type of knitting machine, loop for loop to point bars to enable transfer of the work to flat knitting machines for completion of the stocking feet in integral continuation.

The present invention is directed toward provision of a work table especially suitable for the purposes mentioned, equipped with adjuncts and appurtenances particularly adapted and correlated to facilitate the transfer work. The table can be economically manufactured from sheet metal, so as to be absolutely sanitary and vermin proof, and can be made very compact, strong and sturdy, yet light in weight. As here shown and described, it provides for the convenient disposal of waste thread ravellings, as well as storage for tools and accessories used by textile workers.

How the foregoing desiderata may be readily attained in practice will be manifest from the detailed description hereinafter of the embodiment of my invention illustrated in the accompanying drawing, which shows in perspective a work table incorporating the present improvements.

The table top herein comprehensively designated 1 is fashioned from a rectangular blank of sheet metal with downward bent edges 2, 2 that are joined at the corners by welding or in any other convenient manner. By virtue of such construction the table top is well stiffened and strengthened, and on the whole rendered more sturdy.

The supporting sub-structure comprises four leg posts 3, 3, of angular cross section and of comparatively thin metal, with their upper ends fitted within and secured to the flange corners of the table top 1. At the lower end of each leg 3 the metal is bent laterally, thereby providing foot flanges 4 which are perforated as shown to take screws or other fastening means when the table is to be secured in place. At a slight elevation from the floor, the legs 3 are joined, at opposite sides and at the back of the structure, by cross bars 5, also preferably of angular cross section. The opposite bars 5 are in turn joined somewhat inward from the front of the table (that side appearing at the left of the illustration) by a lateral connecting bar 6 that serves as a foot rest for the operative.

Upstanding from the table top 1 adjacent to one side edge are a pair of spaced brackets 7, 7 which jointly constitute a rack for transfer bars. As shown, the brackets 7 provide sloped complemental ledges 8 to support opposite ends of the point bars with the work hanging over the side table edge, in such manner as to render the bars and work easily removable. The rear portion of the table top 1 is occupied by a magazine rack comprising a pair of centrally-disposed laterally-recessed parallel rails 9 across which the blank transfer bars are laid. In the present instance, these racks are formed from sheet metal, with up-turned stop ends 10 to restrain the bars from falling out.

At one of the forward corners, the table top 1 is equipped with a fixed or stationary rubbing block 12 which is covered with leather and adapted to be used for scoring the fabrics,—an operation by which the loops in the transfer courses of the fabrics are dilated to facilitate impalement upon the points of the transfer bars.

For convenience in disposing of the waste yarn resulting from ravelling of the "looper's rounds", the table top 1 is provided with a central opening 13, for direct communication into a subjacent drawer 14 that is slidably supported by suitable guides, not shown. This drawer 14 is likewise fashioned from sheet metal, with a rolled grasp bead 15 along its front edge, and a partition 16 that sets apart a compartment in the front which may be used for storage of tools and other accessories necessary to the operative.

The structure is further provided with a work holder in the form of an arm 17, which, in the present instance, is screwed fast to the right hand leg 3 at the front of the table, and projects to one side of the operative. This holder 17 is useful as a hanger to temporarily support a batch of stocking legs which are to be looped on the transfer bars.

It is of course to be understood that the appurtenances on the table top 1 may be arranged otherwise than herein illustrated.

Having thus described my invention, I claim:

1. A topper's work table comprising a top and an open substructure to support it with free leg room beneath for the operative; a pair of rails for transfer bars on the table top in front of an operative seated at it; and a rack on the table top, comprising members with surfaces inclined upward and outward toward the edge of the table, for supporting the ends of transfer bars.

2. A topper's work table comprising a top and an open substructure to support it with free leg room beneath for the operative; a pair of rails for transfer bars on the table top in front of an operative seated at it; a rack on the table top, comprising members with surfaces inclined upward and outward toward the edge of the table, for supporting the ends of transfer bars; and a hanger projecting from the table at one side of the operative, for supporting the work.

3. A topper's work table comprising a top and an open substructure to support it with free leg room beneath for the operative; a pair of rails for transfer bars on the table top in front of an operative seated at it; a rack on the table top, comprising members with surfaces inclined upward and outward toward the edge of the table, for supporting the ends of transfer bars; and a scoring block attached to the table for dilating fabric loops to facilitate their transfer to the bars.

4. A topper's work table comprising a top and an open substructure to support it with free leg room beneath for the operative; a pair of rails for transfer bars on the table top in front of an operative seated at it; a rack on the table top, comprising members with surfaces inclined upward and outward toward the edge of the table, for supporting the ends of transfer bars; a hanger projecting from the table at one side of the operative, for supporting the work; and a scoring block attached to the table for dilating fabric loops to facilitate their transfer to the bars.

5. A topper's work table comprising a top and an open substructure to support it with free leg room beneath for the operative; a pair of rails for transfer bars on the table top extending from in front of an operative seated at the table toward its opposite edge; a drawer for waste beneath the table top, with an opening through the top in front of the operative into said drawer; and a rack on the table top to one side of said rails and said opening, comprising members with bar-supporting surfaces inclined upward and outward toward the table edge.

6. A topper's work table comprising a top and an open substructure to support it with free leg room beneath for the operative; a pair of rails for transfer bars on the table top extending from in front of an operative seated at the table toward its opposite edge; a drawer for waste beneath the table top, with an opening through the top in front of the operative into said drawer; a rack on the table top to one side of said rails and said opening, comprising members with bar-supporting surfaces inclined upward and outward toward the table edge; and a hanger projecting from the table substructure at one side of the operator, for supporting the work.

7. A topper's work table with a top, an open substructure to support it at an elevation with free leg room beneath for the operative; a rack on the table top adjacent one side thereof, said rack comprising a pair of brackets with inclined ledges to support the opposite ends of a number of looped transfer bars with the mounted work overhanging the adjacent edge of the table, a pair of rails at the rear of the table adapted to be bridged by transfer bars; and a scoring block fixed on the table top for dilating the loops of the terminal courses of the fabric to facilitate their transfer to the points of the bars.

8. A topper's work table with a top, an open substructure to support it at an elevation with free leg room beneath for the operative; a rack on the table adjacent one side thereof, said rack comprising brackets with inclined complemental ledges of angular cross-section having stop walls at the lower ends, said rack being adapted to support the ends of a number of looped transfer bars with the mounted work overhanging the adjacent edge of the table; a pair of rails at the rear of the table adapted to be bridged by transfer bars; and a leather-faced scoring block on the table for dilating the loops of the terminal courses of the fabric to facilitate their transfer to the points of the bars.

In testimony whereof, I have hereunto signed my name at Philadelphia, Pennsylvania, this 15th day of September, 1930.

JOAH BROGDEN.